United States Patent [19]

Perkins

[11] 4,165,787

[45] Aug. 28, 1979

[54] INVERTIBLE PLOW CONSTRUCTION

[76] Inventor: Charles M. Perkins, R.F.D. #2, Albion, Ill. 62806

[21] Appl. No.: 878,012

[22] Filed: Feb. 15, 1978

Related U.S. Application Data

[63] Continuation of Ser. No. 599,113, Jul. 25, 1975, abandoned.

[51] Int. Cl.² ............................................. A01B 3/42
[52] U.S. Cl. .................................... 172/219; 172/225
[58] Field of Search ................. 172/34, 204, 210, 211, 172/212, 219, 220, 224, 225, 226, 227, 314, 439, 693, 695

[56] References Cited

U.S. PATENT DOCUMENTS

| | | | |
|---|---|---|---|
| 717,455 | 12/1902 | Sanders | 172/695 X |
| 1,279,588 | 9/1918 | Richefeu | 172/34 |
| 2,017,872 | 10/1935 | Strandlund | 172/212 |
| 2,591,711 | 4/1952 | Moore | 172/210 |
| 2,676,524 | 4/1954 | Bashor | 172/219 |
| 2,777,373 | 1/1957 | Pursche | 172/212 |
| 3,528,506 | 9/1970 | Drummond | 172/314 |
| 3,554,294 | 1/1971 | Morkoski et al. | 172/225 X |
| 3,583,494 | 6/1971 | Thompson et al. | 172/439 X |
| 3,744,573 | 7/1973 | Mellen | 172/225 |

FOREIGN PATENT DOCUMENTS 1024964  1/1953  France ...................................... 172/34

Primary Examiner—Richard T. Stouffer
Attorney, Agent, or Firm—Robert K. Youtie

[57] ABSTRACT

A plow construction including a frame extending rearward from a tractor and swingable up and down relative to the tractor, a rear frame part being swingable with the frame and rotatable relative thereto about a forward and rearward axis, plow discs carried by the rear frame part for ground tilling engagement and movable therewith about the forward and rearward axis for inversion of the discs to reverse the ground tilling direction, and a guide wheel carried by the frame for counteracting side draft forces of the tilling wheels.

3 Claims, 4 Drawing Figures

INVERTIBLE PLOW CONSTRUCTION

CROSS-REFERENCES TO RELATED APPLICATIONS

This application is a continuation of application Ser. No. 599,113, filed July 25, 1975 now abandoned.

BACKGROUND OF THE INVENTION

While the art of ground working is one of the oldest, conventional tillers, plows, harrows and the like, continue to require considerable pulling forces and consequent large expenditures of time and energy.

SUMMARY OF THE INVENTION

It is, therefore, an important object of the present invention to provide a disc plow which considerably reduces the necessary pulling forces required and time and energy expanded, which is adapted for simple, staunch and sturdy construction, resulting in economy of manufacture, sale and upkeep, as well as great durability and reliability throughout a long useful life.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

DESCRIPTION OF THE PREFERRED EMBODIMENT

Figure 1:
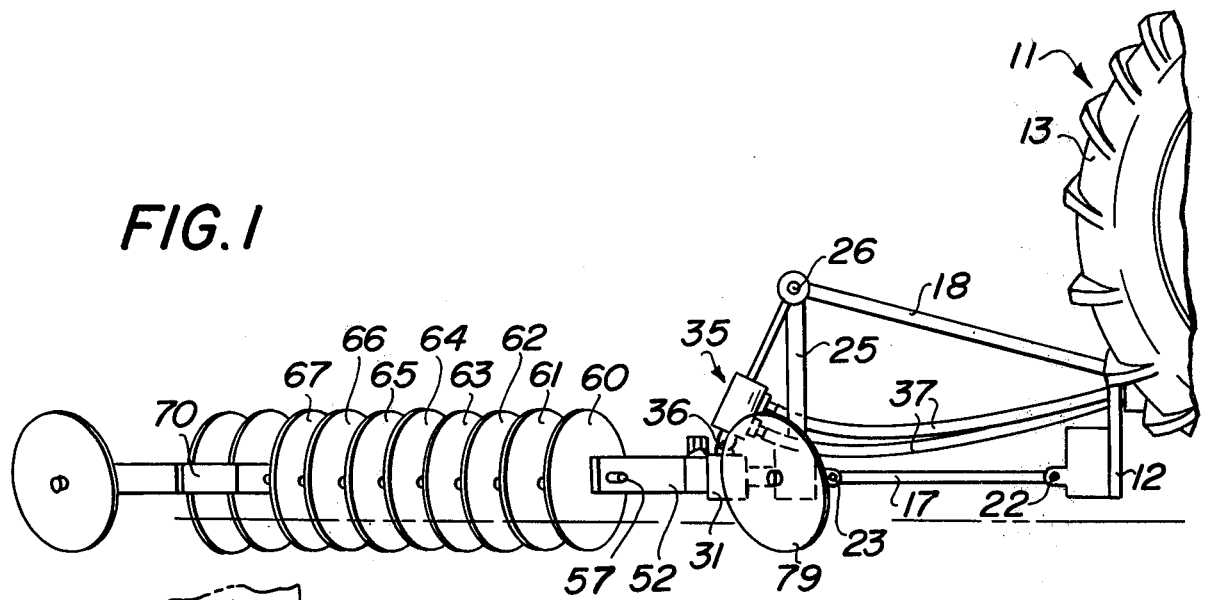
FIG. 1 is a side elevational view showing a disc plow of the present invention in operative association with a tractor.
Figure 2:
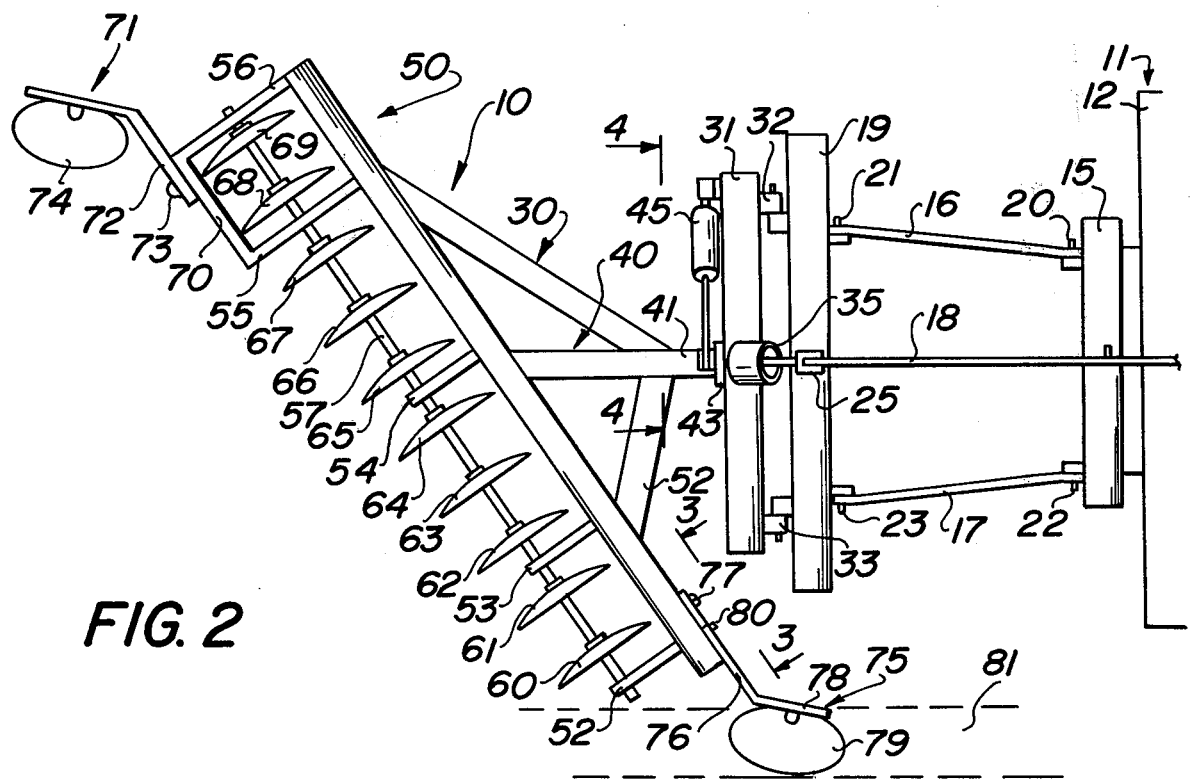
FIG. 2 is a top plan view of the disc plow of FIG. 1.

Referring now more particularly to the drawings, and specifically to FIGS. 1 and 2 thereof, a disc plow of the present invention is there generally designated 10, and illustrated in position behind and connected to a tractor 11. The tractor 11 may include a chassis or frame 12, as between right and left rear wheels 13. The tractor chassis may include a laterally extending connection member 15, from which extend rearwardly a pair of laterally spaced lower links or lift arms 16 and 17, and a rearwardly extending, centrally located upper link or arm 18. Connected to the rearward ends of lower lift arm 16 and 17 may be a lateral member 19, which may be of box frame construction in horizontal disposition, spaced rearwardly from and parallel to the lateral member 15. In particular, the forwardly and rearwardly extending lower link 16 may have its front and rear ends respectively pivotally connected to the members 15 and 19, as by pivots 20 and 21, while the lower link 17 may similarly have its forward and rearward ends pivotally connected to members 15 and 19 by pivotal connections 22 and 23.

A rigid upstanding lever or arm 25 may project laterally medially from the box frame part 19, and the rearward end of laterally medial link 18 may be pivoted to the upper end of arm 25, as by pivot connection 26. The forward end of link 18 may extend to the tractor 11 for connection thereto (not shown) either movable or fixed, as desired. Thus, the assemblage of links 16 and 17, and lateral member 19 may be raised or swung upwardly about the laterally extending horizontal axis of pivotal connections 20 and 22, by a tension force exerted on link 18. Suitable contact and operating means may be associated with link 18 for this purpose, if desired.

The plow construction 10 is operatively associated with the tractor 11 just rearward of the lateral member 19, and includes a frame structure, generally designated 30. In operative condition the frame structure is generally horizontally disposed and extends in a forward and rearward direction behind the lateral member 19.

In particular, the frame structure 30 includes a laterally extending, horizontally disposed forward frame part or member 31, located in adjacent parallelism with and behind lateral member 19. The forward frame part 31 may also be of box frame construction, and provided with pivotal connections 32 and 33 to the lateral member 19. The pivotal connections 32 and 33 are aligned along a generally horizontal laterally extending axis to mount the forward frame part 31 for swinging movement up and down about the axis of pivotal connections 32 and 33. An operating mechanism 35, which may assume the form of an hydraulic cylinder and piston assembly, may have its opposite ends connected between the forward frame part 31, as by a pivot connection 36, and the pivot connection 26 of upstanding arm 25. Thus, by the extensile and retractile character of operating mechanism 35, forward frame part 31 is caused to swing up and down about the axis of aligned pivotal connections 32 and 33. Actuation of this operation may be effected by any suitable means, such as hydraulically through fluid conduits 37 extending to the tractor 11 for connection to a suitable source of pressurized fluid.

Extending rearwardly from a laterally medial region of forward frame part 31 is an intermediate frame part, pipe or tube 40, which has its forward end axially journaled, as at 43, in the forward frame part 31. Thus, intermediate frame part 40 is axially rotatable about the approximately longitudinal center line of the plow 10 and tractor 11. Also, intermediate frame part 40 is swingable upwardly and downwardly together with forward frame part 31 which mounts the intermediate frame part. More specifically, the intermediate frame part 40 may include an elongate hollow tube 41, see FIG. 4, rotatably circumposed about an inner supporting member or rod 42, suitably fixed to the frame part 31. Other suitable journaling structure may be employed, if desired.

In order to effect approximately 180° rotation of intermediate frame part 40, there is employed an operating mechanism 45, which may be of extensile and retractile character, such as a piston and cylinder connected between the forward frame member 31 and the rotatable intermediate frame part tube 41. Specifically, the cylinder and piston mechanism 45 may have one end, say the cylinder pivotally connected, as at 46, to the forward frame part 31, and may have its piston rod end pivotally connected, as by pivot 47 to an ear or arm 48 projecting from the tube 41.

Suitable fluid pressure conduit means are shown at 49, which may extend to the tractor operating station for actuation by the driver.

Figure 4:
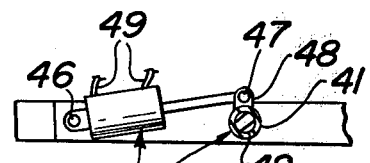
FIG. 4 is a partial perspective view taken generally along the line 4—4 of FIG. 2, illustrating an operating mechanism in greater detail.

It will now be appreciated that the intermediate frame part 40 is axially rotatable 180°, as between the illustrated position of FIG. 4 and an inverted position with the ear 48 projecting downwardly, as by operation of the extensile and retractile mechanism 45. Any suitable operating means may be employed, as desired, for effecting the 180° rotation or inversion of tube 41.

Of course, the frame 30 is necessarily swung upwardly for its inversion or 180° rotation about the axis of tube 41. Upward swinging may be effected by retraction of cylinder and piston means 35 to swing forward frame part 31 about the axis of pivot means 32 and 33 and/or forward shifting of member 18 by suitable tractor operating means.

A rearward frame part 50 is rigidly fixed to the intermediate frame part 40, as to the rearward end of tube 41 and is generally coplanar with the intermediate frame part or horizontal in operating condition, while extending transverse to the intermediate longitudinal tube 41. More specifically, the rear frame part 50 is oblique to the longitudinal frame direction of intermediate frame part 40 and fixed oblique to the latter by a pair of rigidly interconnected struts or braces 51 and 52 extending from opposite sides of the tube 41 to spaced locations on the rear frame part.

Extending from the rear side of rear frame part 50, generally normal thereto at spaced location therealong, so as to be oblique to the longitudinal frame direction, are a plurality of generally horizontal, parallel journal supports or bars 52, 53, 54, 55 and 56. A generally horizontal disc carrying rod or shaft 57 extends in rearwardly spaced parallelism with respect to the rear frame part 50, being axially rotatably supported or journaled in the several journal bars 52-56. Thus, the shaft 57 is generally coplanar with the rear frame part 50, intermediate frame part 40, forward frame part 31 and struts 51 and 52 for up and down movement therewith, and rotation with the intermediate frame part 40 about the axis of the latter. A plurality of discs 60-69 are carried by the shaft 57 for coaxial rotation therewith. The discs 60-69 may be of any suitable ground working type, as for rolling, tilling engagement with the soil.

Adjacent to one end of the rearward frame part 50, a pair of the journal bars 55 and 56 may be extended rearwardly and rigidly connected together by a connecting bar 70 for structural reinforcement. A guide wheel assembly 71 may be carried by the bar 70 for location rearwardly of the discs 60-69, and specifically approximately rearward of the disc 69. The guide wheel assembly 71 may include a wheel mounting arm 72 having one end fixed by suitable securement means 73 to the bar 70, and rotatably carrying a ground engageable guide wheel 74 at its other end, rearward of and behind disc 69 for ground engagement in the furrow of the latter disc. A suitable oblique disposition of guide wheel 74 may be employed to counteract the side draft tendency of plow 10 resulting from the ground engaging operation of discs 60-69.

Figure 3:
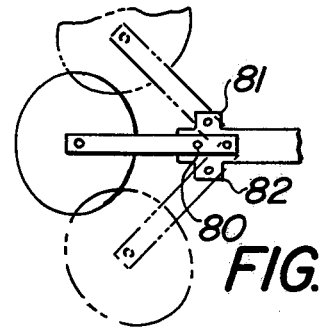
FIG. 3 is a partial elevational view, taken generally along the line 3—3 of FIG. 2, illustrating an alternate position of guide wheel.

A further guide wheel assembly is generally designated 75 and located forward of the several discs 60-69. More specifically, as best seen in FIG. 2, the guide wheel assembly 75 is located forward of the discs 60-69 and to one side of the several discs. The forward guide wheel assembly 75 may include a support arm 76 having one end connected to the forward end of rearward frame member 50, as by a pivotal connection 77 affording a degree of relative swinging movement out of the normal operating horizontal position, as seen in FIG. 3. That is, the wheel carrying arm 76 extends from the rearward frame member 50 in the same general horizontal plane with the latter forwardly and rightwardly, as viewed in FIG. 2, beyond the rearward frame member to a terminal end portion 78 which carries a ground engageable guide wheel 79. The wheel carrying arm 76 is releasably held in its normally operative horizontal position by a pin 80 extending removably through the arm, at a location spaced from the pivot 77, into the rearward frame member. In this condition, as shown in FIG. 2 and in solid lines in FIG. 3, the wheel 79 rides in a previously formed furrow 81 in a manner to counteract the side draft of the tilling discs 60-69. Of course, the plow discs 60-69 and guide wheels 74 and 79 are operative in the same manner as described above upon inversion of the rearward frame part 50, whereupon the discs will throw soil in the opposite direction.

It may be desirable, under certain circumstances, to raise the guide wheels 79, as on an initial pass of the plow 10 when there is no furrow in which the wheels 79 may ride. For this purpose, the wheel mounting arm 76 may be provided with a pair of vertically oppositely extending apertured wings 81 and 82, see FIG. 3, the lower of which may be swung with the arm for receiving pin 80 to retain the arm in the illustrated upper position. Of course, with the rearward plow part 50 inverted, the illustrated upper wing 81 will be lowermost and employed to retain the guide wheel elevated.

As is well known to those versed in the art, a great degree of versatility may be achieved by the hereinbefore described construction. For example, an operator may make a U-turn at the end of each pass and, by inverting the rearward plow part 50, effect tilling of the next adjacent pass by forming furrows or tilling in the same direction. Of course, the depth of tilling may be controlled by selective hydraulic pressure applied to operating means 35, or from the tractor by control of link 18. Also, if desired, the ground may be tilled twice in opposite directions, as by a double pass without inversion of the rearward plow part 50, for final working of the soil.

From the foregoing it will now be appreciated that the present invention provides a disc plow which is extremely versatile in operation, quick and easy to adjust and set up, effects considerable reduction in necessary pulling force as well as time and energy expended, and otherwise fully accomplishes its intended objects.

Although the present invention has been described in some detail by way of illustration and example for purposes of clarity of understanding, it is understood that certain changes and modifications may be made within the spirit of the invention.

What is claimed is:

1. A plow construction and three point hitch connected thereto, said three point hitch having upper and lower elements, said construction comprising a rigid framework connected to said hitch elements to maintain the latter in fixed spaced relation, a forward frame part rearwardly of said framework, pivotal connection means extending forwardly from said forward frame part and having a laterally generally horizontally disposed pivotal axis for connection to said rigid framework for up and down swinging movement of said forward frame part about said lateral axis, piston and cylinder means having one end pivotally connected to said forward frame part and having its other end connected to the upper hitch element for effecting up and down swinging movement of said forward frame part about said lateral axis, an intermediate frame part extending rearwardly from and rotatably supported by said forward part for up and down swinging movement therewith about said lateral axis and rotation relative thereto about a longitudinal axis generally normal to said lateral axis, additional piston and cylinder means having its cylinder end pivotally connected to said forward frame part and having its piston end pivotally connected to said intermediate frame part for effecting approximately 180° rotation of said intermediate frame part about said longitudnal axis, a rearward frame part extending transversely obliquely of and secured to the rearward region of said intermediate frame part for movement with the latter, journal means carried by said rearward frame part, a plurality of plow discs rotatably supported by said journal means for ground tilling engagement, said discs being reversible in direction with inversion of said rear frame part, and at least one guide wheel carried by said rearward frame part laterally outwardly and forwardly of said discs for guiding ground engagement with a previously tilled furrow, said rear frame part extending obliquely to said longitudinal axis of rotation, said plow discs being located spaced along and freely rotatable about an axis generally parallel to and approximately horizontally coplanar with said rear frame part, said intermediate and rear frame parts being rotatable about said approximately 180° to raise the forwardmost of said discs and lower the rearwardmost of said discs upon upward swinging movement about inversion of said rear frame part with minimum upward swinging movement of the latter.

2. A plow construction according to claim 1, in combination with an additional guide wheel located adjacent to and rearwardly of the rearwardmost of said discs for rolling engagement in a furrow being made and enabling inversion with a minimum upward swinging movement.

3. A plow construction for connection to a three point hitch having an upper element and lower elements, said plow construction being movable vertically by said three point hitch, said construction comprising a rigid framework with first connection means for connection with said lower elements and second connection means extending upwardly therefrom for connection with said upper element, said first and second connection means maintaining said hitch elements in fixed spaced relationship to each other, a forward frame part rearwardly of said framework, third connection means extending forwardly from said forward frame part and having a laterally generally horizontally disposed pivotal axis for connection to said rigid framework for up and down swinging movement of said forward frame part about said lateral axis, piston and cylinder means having one end pivotally connected to said forward frame part and having its other end connected to said second connection means for effecting up and down swinging movement of said forward frame part about said lateral axis, an intermediate frame part extending rearwardly from and rotatably supported by said forward frame part for up and down swinging movement therewith about said lateral axis and rotation relative thereto about a longitudinal axis generally normal to said lateral axis, additional piston and cylinder means having its cylinder end pivotally connected to said forward frame part and having its piston end pivotally connected to said intermediate frame part for effecting approximately 180° rotation of said intermediate frame part about said longitudinal axis, a rearward frame part extending transversely obliquely of and secured to the rearward region of said intermediate frame part for movement with the latter, journal means carried by said rearward frame part, a plurality of plow discs rotatably supported by said journal means for ground tilling engagement, said discs being reversible in direction with inversion of said rear frame part, and at least one guide wheel carried by said rearward frame part laterally outwardly and forwardly of said discs for guiding ground engagement with a previously tilled furrow, said rear frame part extending obliquely to said longitudinal axis of rotation, said plow discs being located spaced along and freely rotatable about an axis generally parallel to and approximately horizontally coplanar with said rear frame part, said intermediate and rear frame parts being rotatable about said approximately 180° to raise the forwardmost of said discs and lower the rearwardmost of said discs upon upward swinging movement about said lateral axis, for ground engagement of said discs on inversion of said rear frame part with minimum upward swinging movement of the latter.

* * * * *